United States Patent [19]

Walshe et al.

[11] Patent Number: 5,114,039
[45] Date of Patent: May 19, 1992

[54] APPARATUS AND METHOD FOR DISCHARGING ARTICLES FROM A VIBRATORY FEEDER

[75] Inventors: Brendan J. Walshe, Pomfret Center; Guenter C. Wexler, Danielson, both of Conn.

[73] Assignee: Spirol International Holding Corporation, Killingly, Conn.

[21] Appl. No.: 590,341

[22] Filed: Sep. 28, 1990

[51] Int. Cl.⁵ ............................................. B65G 47/24
[52] U.S. Cl. .................................... 221/171; 271/167; 271/200; 198/389; 198/391
[58] Field of Search ............... 198/391, 389; 221/200, 221/160, 163, 165, 168, 167, 171, 172, 173

[56] References Cited

U.S. PATENT DOCUMENTS

| | | | |
|---|---|---|---|
| 3,275,120 | 9/1966 | Gardner | 221/167 |
| 3,578,142 | 5/1971 | Burgess | 221/171 |
| 3,658,207 | 4/1972 | Schultz | 221/167 |
| 4,365,445 | 12/1982 | Watson | 221/167 |

FOREIGN PATENT DOCUMENTS 0012510 1/1986 Japan .................................. 198/391

Primary Examiner—H. Grant Skaggs
Attorney, Agent, or Firm—Hayes & Reinsmith

[57] ABSTRACT

An apparatus is disclosed for transferring flanged articles from a vibratory feeder to a discharge station which features a pair of feed rails one of which has a curved external hearing surface for providing point bearing contact with a flange of the article being transferred.

A method is disclosed for discharging and orienting flanged articles for delivery from a vibratory feeding device which includes the mounting of one of a pair of feed rails above the other feed rail at an entrance end of a discharge device for supporting the flanged article with its body portion tilted away from the other rail and supporting an outlet end of the discharge device such that its rails position the body portion of the flanged article in a substantially vertical orientation.

24 Claims, 8 Drawing Sheets

APPARATUS AND METHOD FOR DISCHARGING ARTICLES FROM A VIBRATORY FEEDER

FIELD OF THE INVENTION

This invention generally relates to vibratory feeders and more particularly to an apparatus and method for vertically orienting and feeding a series of flanged articles for discharge from a vibratory feeder bowl.

BACKGROUND OF THE INVENTION

Vibratory feeders are typically used to improve productivity in automated manufacturing processes. The feeders deliver articles such as component parts for subsequent use, e.g., by a base assembly machine in the manufacture of a subassembly or a final product.

Such vibratory feeders may be used for feeding flanged articles. These articles include headed fasteners, e.g., screws, nails, pop rivets and other flanged parts such as syringes, fittings and the like. A typical vibratory bowl feeding system comprises a feeder bowl mounted for controlled vibratory motion on a vibratory driver. Specially tooled, internal tracks are formed within the bowl in a helical configuration between a bottom of the bowl and a discharge at a top of the bowl. The vibratory driver may be of a fixed angle or variable angle type suitable for vibrating the feeder bowl to feed the articles along the tracks to the feeder bowl discharge outlet. Additionally, specially tooled surfaces may be mounted between the discharge outlet of the feeder bowl and a final location designated for delivery of the articles being fed, e.g., to a downstream assembly machine.

It is normally desirable that the aforementioned flanged articles be discharged in a particular vertical orientation. A traditional prior art method for vertically orienting a flanged article is to form a longitudinally extending gap or slot in the feeder bowl tooling surface and to rely on the bodies of the articles to fall through the slot into a vertical or upright position. The flange of the article is thereafter supported for movement on flat "running surfaces" or planar transfer surfaces formed on both sides of the slot, and the vibratory bowl motion imparts movement to the articles for discharging them from the feeder bowl. That slot allows the body of a part to fall through randomly and is normally fabricated in the bowl with a gap width dedicated to the corresponding part diameter or body size.

The surface-to-surface or surface bearing contact areas between the flanged surfaces of the articles and the planar transfer surfaces is a function of the gap width which is slightly larger than the body size to allow free movement. In a typical application, wherein a part having a 1 inch flange diameter, a ¼ inch body diameter and feed rails having a discharge slot with a 0.260 inch gap width to accommodate manufacturing tolerances and free movement are provided, about two-thirds of the bottom surface area of the flange is in surface contact with the track. Because of the resulting frictional resistance between these surfaces, the delivery rate of the feeder is reduced. Accordingly, the feed rate is conventionally increased by increasing the vibrational amplitude and/or frequency of the driver; however, excessive "bouncing" of articles may result, thereby reducing the number of articles delivered to the slot from the internal track and also commonly causing jamming of adjacent articles due to the articles rocking back and forth within the discharge slot resulting in overlapping of their flanges on the planar transfer surfaces. Additionally, the width of the slot may be increased somewhat in these conventional structures to reduce the bearing surface contact; however, the articles then may become unstable on the feed rails, thereby reducing the feed rate and again causing jams typically due to overlapping of the flanges of the articles.

OBJECTS OF THE INVENTION

A principal object of this invention is to provide a new and improved vibratory feeder apparatus and discharge rail for feeding flanged articles to be discharged from a vibratory feeder bowl and which vertically orients the articles prior to their discharge while providing reduced bearing surface contact with the flanges of the articles for improved efficiency and substantially jam-free feeding at increased delivery rates.

Another object of this invention is to provide a vibratory feeder apparatus and discharge rail of the above described type which feeds articles for discharge at an increased feed rate while at the same time increasing article stability and reducing the heretofore commonly encountered jamming of articles. Related to this object is the aim of providing such a discharge rail which has reduced adjustment requirements for accommodating articles of various sizes, and features simplicity of design and ease and economy of low cost manufacture.

A further object of this invention is to provide a new and improved method of feeding flanged articles for discharge from a vibratory bowl feeder wherein the articles are supported with significantly reduced bearing contact for substantially trouble free efficient discharge at increased rates of feed and are oriented at discretely different angular attitudes in the discharge slot for minimizing jamming of the articles.

Other objects will be in part obvious and in part pointed out in more detail hereinafter.

A better understanding of the objects, advantages, features, properties and relations of the invention will be obtained from the following detailed description and accompanying drawings which set forth an illustrative embodiment and are indicative of the various ways in which the principles of the invention are employed.

SUMMARY OF THE INVENTION

An apparatus and discharge rail constructed according to this invention comprises an elongated rail having an arcuately extending major axis mounted at one rail end adjacent a vibratory feeder bowl output tooling surface. An opposing terminal end of the rail is supported on a mounting bracket adjacent a discharge end of the output tooling surface, thereby forming a discharge outlet at the end of a discharge slot between the rail and the tooling surface with the slot arcuately extending between opposing input and terminal rail ends. An article supporting surface is formed on the rail between its ends. A series of substantially identical articles each having an elongated body portion and a flanged surface extending outwardly from that body portion are fed in random positions from the bowl tooling surface to the discharge slot by the vibratory motion of the feeder bowl. The body portion of each article is received in the discharge slot; the rail surface and the output tooling surface cooperate to support the flanged surface of each article for sliding movement. The rail surface provides significantly reduced bearing contact with the flanges of the articles, thereby providing a correspondingly increased rate of feeding of articles supported for sliding movement thereon for discharge from the bowl. Additionally, each of the series of articles supported for movement along the discharge slot is oriented with respect to the vertical at a slightly different angle than the adjacent articles, thereby reducing jams commonly caused by overlapping of the article flanges.

In further accord with this invention, the rail and the confronting output tooling surface of the bowl are disposed at a downwardly extending angle with respect to a horizontal plane from the input rail end to the opposing terminal rail end for gravity assisted sliding movement of the supported articles. The input rail end is adjustably mounted for varying the slope of the downwardly extending angle, and the opposing terminal rail end is adjustably mounted for varying the width of the slot for receiving articles having bodies of various shapes and sizes and different flange configurations.

In accordance with this invention, a new and improved method is disclosed which includes forming a discharge slot in part by an elongated rail having an arcuately extending major axis and an article supporting contoured surface between opposing rail ends. The method contemplates supporting articles in the slot for sliding movement in a vertical orientation for discharge from an outlet of an output tooling surface. Efficient jam-free discharge of the articles is effected by reducing the bearing contact between the flanges of the articles and the supporting surfaces defining the slot, by virtue of providing point contact bearing support of the article flanges along the contour of the supporting rail surface.

In further accord with the method of this invention, orienting the rail and the output tooling surface at a downwardly extending angle with respect to a horizontal plane from an input rail end to the opposing terminal rail end provides for gravity assisted sliding movement of articles supported thereon. By adjustably mounting the input rail end, the slope of the downwardly extending angle may be varied; and by adjustably mounting the terminal rail end on the bowl, the width of the slot may be tailored to accomodate articles of different sizes and configurations.

BRIEF DESCRIPTION OF THE DRAWINGS

FIG. 6b is an enlarged cross-sectional view of an alternative embodiment of the rail of FIG. 6a;

FIG. 6c is an enlarged cross-sectional view of another alternative embodiment of the rail of FIG. 6a;

FIG. 6d is an enlarged cross-sectional view of yet another alternative embodiment of the rail of FIG. 6a;

DETAILED DESCRIPTION OF A PREFERRED EMBODIMENT

Figure 1:
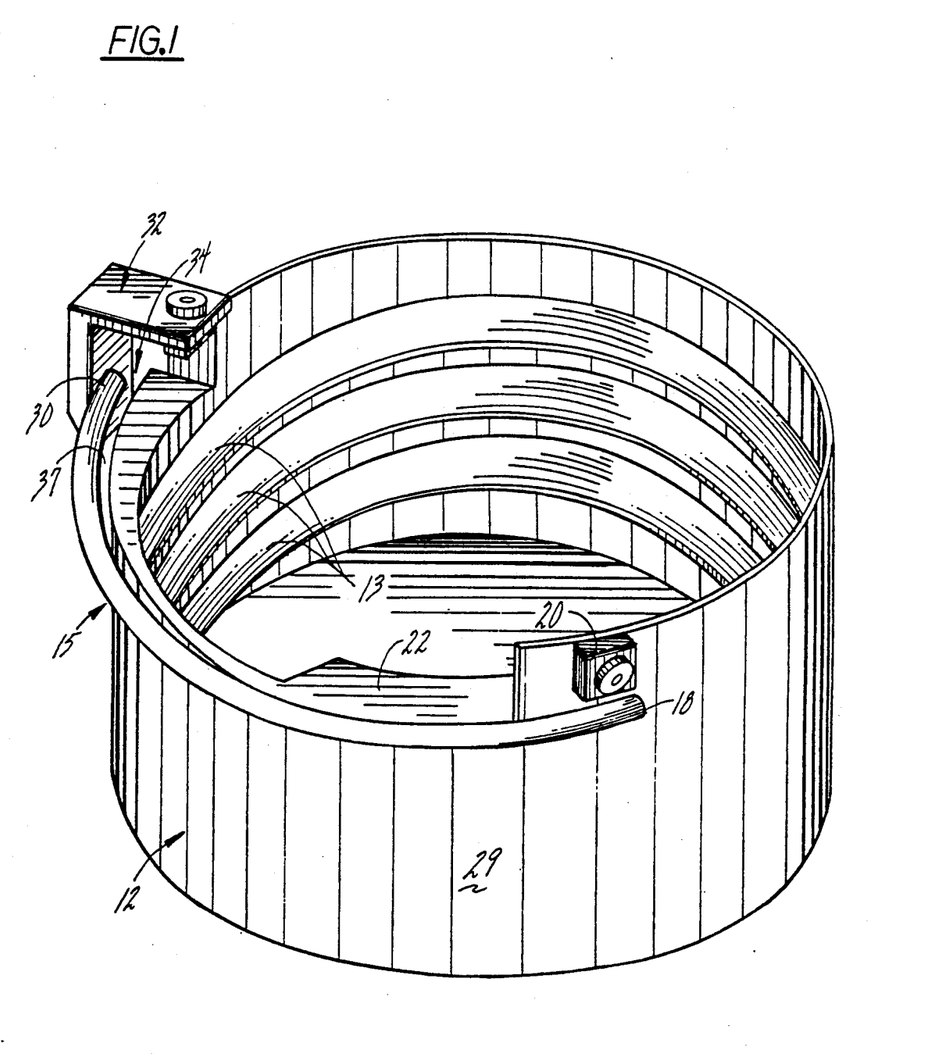
FIG. 1 is an isometric view of a vibratory feeder incorporating this invention.
Figure 8A:
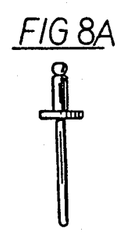
FIG. 8a is a side view of a rivet.
Figure 8B:
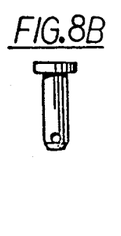
FIG. 8b is a side view of a headed stud.
Figure 8C:
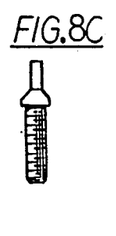
FIG. 8c is a side view of a contact pin.
Figure 8D:
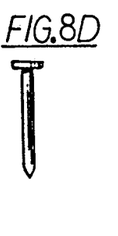
FIG. 8d is a side view of a nail.
Figure 8E:
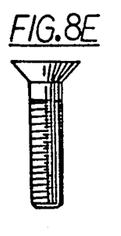
FIG. 8e is a side view of a slotted pan head screw.
Figure 8F:
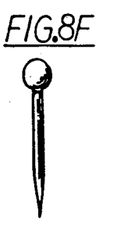
FIG. 8f is a side view of a common pin.
Figure 8G:
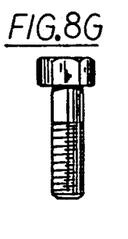
FIG. 8g is a side view of a bolt having a hexagonal head.
Figure 8H:
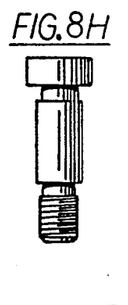
FIG. 8h is a side view of a captive screw.
Figure 8I:
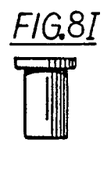
FIG. 8i is a side view of a weld stud.
Figure 8J:
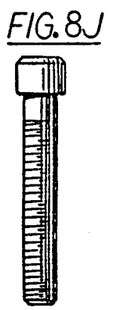
FIG. 8j is a side view of a socket cap screw.
Figure 8K:
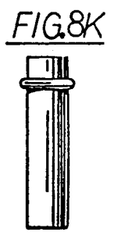
FIG. 8k is a side view of a tubular rivet.
Figure 8L:
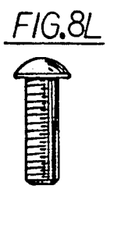
FIG. 8l is a side view of another socket cap screw.
Figure 8M:
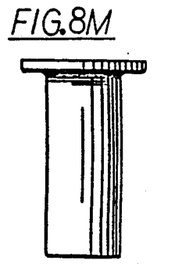
FIG. 8m is a side view of a bullet casing.
Figure 8N:
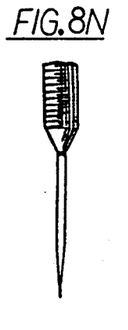
FIG. 8n is a side view of a syringe needle.
Figure 8O:
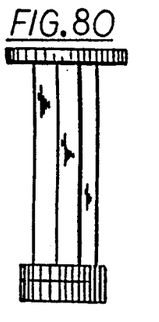
FIG. 8o is a side view of a syringe plunger.
Figure 8P:
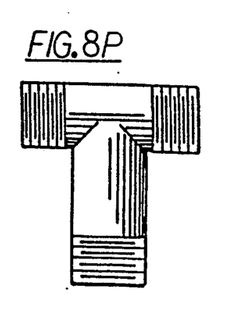
FIG. 8p is a side view of a pipe "T" fitting.

Referring in detail to the drawings, a vibratory feeder bowl 12 is shown in FIG. 1 featuring a construction which is particularly well suited for vertically orienting and feeding flanged articles for discharge to a downstream machine, not shown, for a subsequent manufacturing step. The term "flanged" as used herein is intended to refer to a lip, edge, rim, ledge or other similar projection extending generally outwardly from the body of an article at any point along its length. FIGS. 8a-8p are illustrative examples of different flanged articles which include certain "headed" parts with projections extending outwardly from the body of the part to form a flanged surface adjacent the top of that part, as well as other articles with flanged surfaces formed intermediate the ends of the body of the part. Moreover, these illustrative examples of FIGS. 8a-8p show bodies of different sizes and of varying cross-sectional configurations including circular and rectangular. While representive, these examples are not intended to be exhaustive, as numerous other flanged articles with bodies and flanged surfaces of different sizes and shapes are contemplated to be fed for discharge in accordance with the apparatus and method of this invention.

It will be seen that the bowl 12 has an internal track 13 formed within bowl 12 and extending in a helical configuration between a bottom of bowl 12 and a discharge at a top of the bowl. The internal profiling of the track 13 will be understood to be tooled in accordance with the products being fed. The internal track 13 terminates in an upper output tooling surface 22.

In accordance with this invention, an elongated discharge rail 15 is provided for defining in part a new and improved, jam-free, discharge slot for the transfer of articles such as those illustrated in FIGS. 8a-8p. More specifically, rail 15 is of elongated arcuate configuration extending along a major axis 17 and in the specifically illustrated embodiment is shown as conforming generally to the corresponding bowl diameter.

Figure 4:
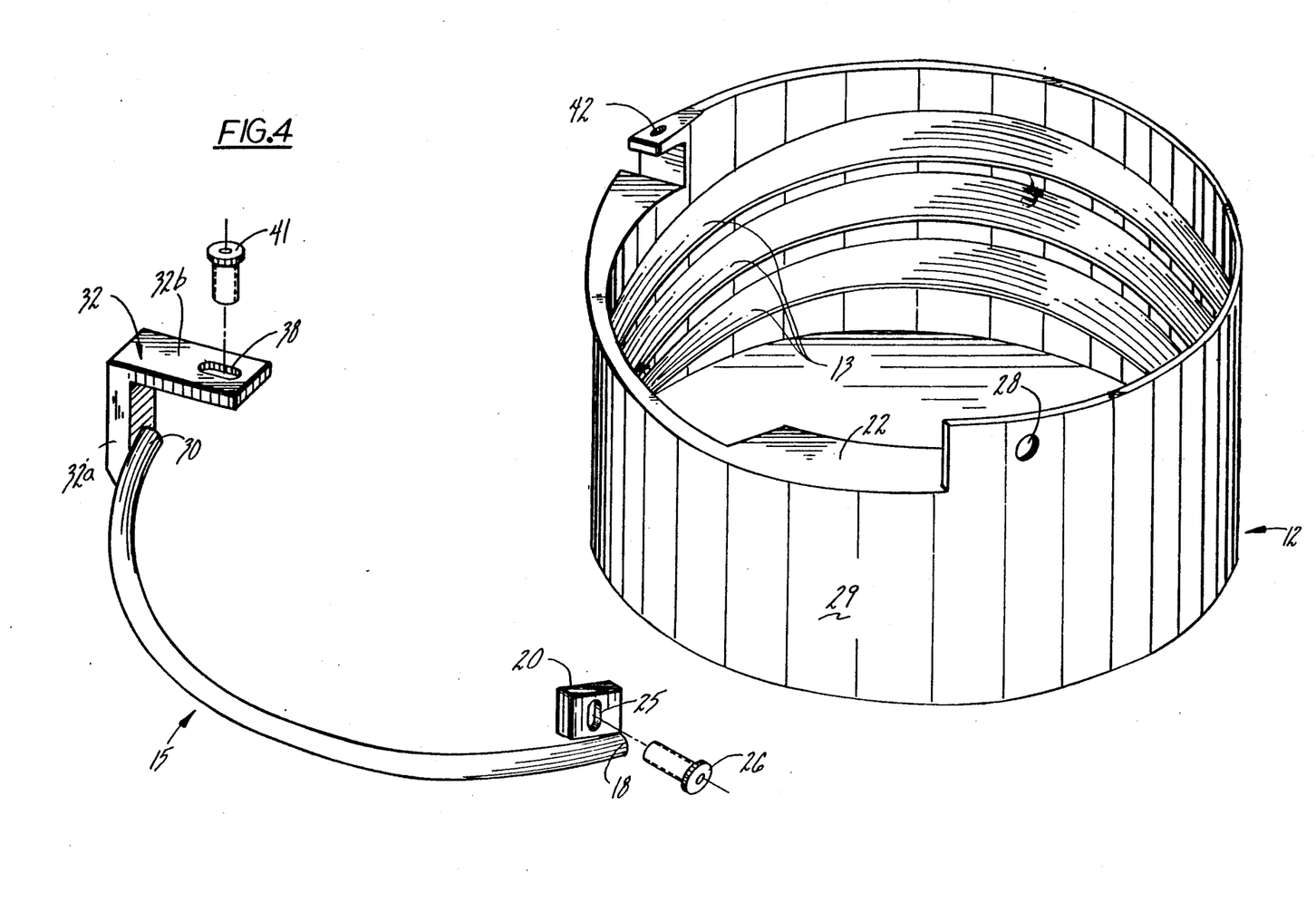
FIG. 4 is an exploded, isometric view showing a discharge rail of this invention in disassembled relation to a vibratory feeder bowl.

One rail end or input end 18 has an adjustable mount or plate 20 secured thereon preferably by spot welding. The adjustable mount 20 is designed for adjustably mounting the input rail end 18 adjacent and intermediate the length of output tooling surface 22 of the vibratory feeder bowl 12. To effect height adjustment of rail end 18 in the preferred embodiment, an aperture or through-hole 25 is shown (FIG. 4) formed in the mount 20 for receiving a threaded fastener 26 to extend through aperture 25 into threaded engagement within an aperture 28 formed in side 29 of the vibratory feeder bowl 12. For precisely adjusting the height of the input rail end 18 relative to surface 22, aperture 25 is shown as having an eliptical shape with a vertically extending major axis.

Figure 3:
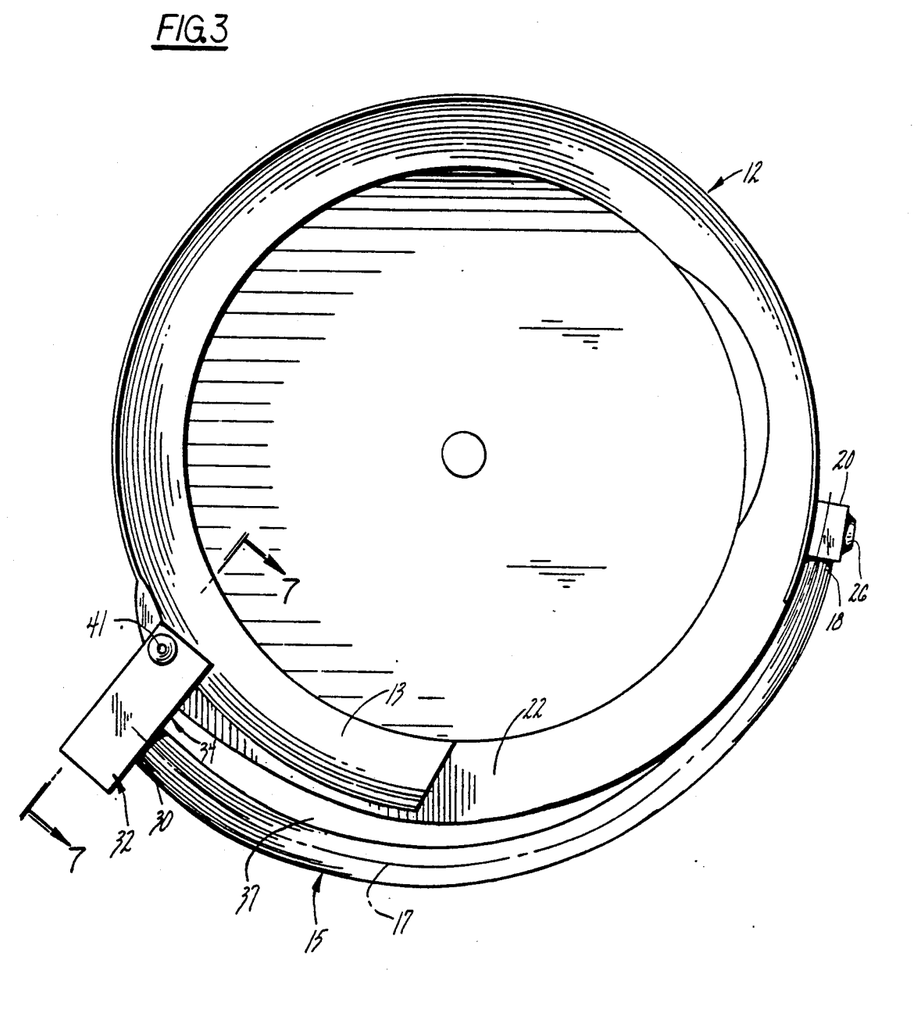
FIG. 3 is a plan view of the feeder of FIG. 1.

An opposing terminal rail end 30 is shown having an L-shaped support bracket 32 which is preferably secured to rail 10 by spot welding its lower leg 32a. Bracket 32 is particularly suited to support the terminal rail end 30 adjacent a discharge end of the feeder bowl output tooling surface 22, thereby forming a discharge outlet 34 for slot 37 (FIGS. 1 and 3). Slot 37 extends between rail 10 and the output tooling surface 22 arcuately between rail ends 18, 30. To customize the bowl for handling articles of varying sizes and shapes, the preferred embodiment provides an aperture or throughhole 38 formed in a horizontally extending body 32b of the bracket 32 for receiving a threaded fastener 41 for engagment with a threaded aperture 42 in the rim of the vibratory feeder bowl 12. The bracket through-hole 38 is eliptical in shape for adjustably mounting bracket 38 to the feeder bowl 12. The elliptically shaped aperture 38 is formed with its major axis extending perpendicular to the discharge slot 37, thereby allowing the width of the feed or discharge slot 37 to be varied as desired for maximizing the flexibility of the bowl for feeding a variety of different articles.

Figure 6A:
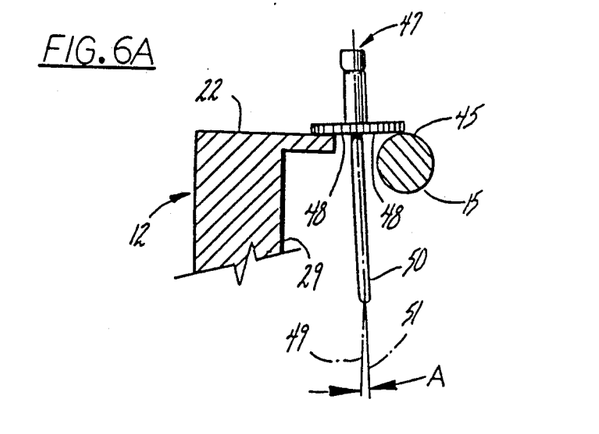
FIG. 6a is an enlarged cross-sectional view taken generally along line 6—6 of FIG. 5.
Figure 7:
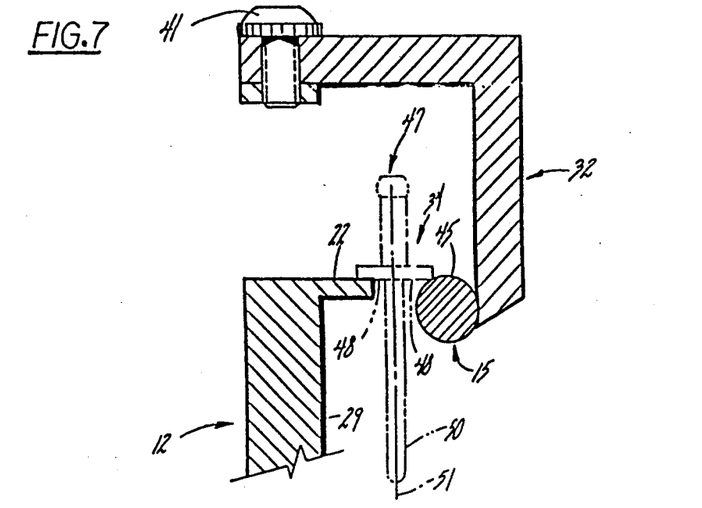
FIG. 7 is an enlarged cross-sectional view taken generally along line 7—7 of FIG. 3, with a rivet supported for discharge being shown in broken lines.

To provide significantly reduced bearing contact with a flanged article supported for sliding movement while additionally providing for reduced friction and substantially trouble-free feeding at increased rates of delivery, an article supporting surface or bearing surface 45 is formed with a curved or arcuate external contour at 45 (FIGS. 6a and 7) on rail 15 between its rail ends 18, 30. The bearing surface 45 and the feeder bowl output tooling surface 22 cooperate to support a flanged article 47, e.g., a rivet, by its flanged surface 48 (FIGS. 6a and 7). In the preferred embodiment, bracket 32 is adjusted so that the slot 37 is sufficiently wide to receive the elongated body portion 50 of the flanged article 47. Additionally, adjustable mount 20 and bracket 32 are precisely adjusted so that the height of the rail bearing surface 45 adjacent input end 18 is slightly higher than the feeder bowl output tooling surface 22, fixed to bowl 12, for orienting the article body 50 with its major axis 51 at an angle "A" (FIG. 6a) with respect to the vertical (as depicted by broken line 49) and extending outwardly relative to the outside surface 29 of the feeder bowl. This outwardly extending angle "A" decreases as each article approaches discharge outlet 34, until the major axis 51 of each article 47 is held in a substantially vertical position for discharge from the feeder bowl (FIG. 7).

As will be understood from the above described construction, each article supported for transfer along the feed rails 15, 22 defining slot 37 is held at a slightly different angle than similarly supported adjacent articles, thereby significantly reducing any tendency of these parts jamming as commonly caused heretofore by undesired lapping of the article flanges. Additionally, the rail bearing surface 45 and the output tooling surface 22 essentially provide point contact with the flanged surface 48 of the article 47 at the input end of rail 10. This significantly reduced contact allows articles to be fed more rapidly for increased rates of delivery along the rail 15 and output tooling surface 22 without the usual frictional resistance afforded by conventional feeders. The bearing contact along rail 10 remains as point contact throughout, and the bearing contact along output tooling surface 22 gradually increases from point contact adjacent the input end 18 of rail 10 (FIG. 6a) to surface contact at discharge outlet 34 (FIG. 7) wherein the article is maintained in its vertical orientation for discharge.

By virtue of this described construction, it will be seen that a further significant advantage is provided in that the contoured radius of the discharge rail 15 allows a user to feed a variety of different sized products with little or no adjustment to rail 15. In addition to accommodating such variations in body sizes, that same rail 15 of this invention with the arcuately contoured configuration serves the valued function of orienting the products being fed by capturing a point on the bottom surface of the flange and directing its body portion 50 downwardly through discharge slot 37, a function heretofore not known to be achieved by the flat track surfaces of conventional discharge rails of vibratory bowl feeders.

Although the rail 15 of the preferred embodiment is shown having a curved or arcuate external contour at 45 (FIG. 6a), the invention also contemplates rails having alternative external contours. For example, a quadrilaterally shaped external contour (i.e., rectangular or square) is specifically shown in FIG. 6b and so positioned that one corner 54 of the rail 15b makes point contact with the flanged surface 48 of the article 47 supported for transfer thereon. Additionally, the surface 55 of the quadrilateral rail 15b adjacent the slot 37 provides the additional function of orienting the article being fed by directing its body portion 50 downwardly through the discharge slot 37.

Certain articles, depending on the body and/or flange configuration and size, may require a second point of bearing contact to help maintain stability of the article during transfer. This "two point" contact may be accomplished using a rail of the above described quadrilateral configuration (FIG. 6b) wherein the one corner 54 of the rail 15b makes point contact with the article flanged surface 48 and a second corner 56 makes point contact with the shank or body portion 50 of the article thereby providing vertical stability to the article during transfer on the rail. Further article stability may be achieved using a rail 15c of hexagonal cross-section (FIG. 6c) where one corner 57 of the rail 15c makes point contact with the article flanged surface 48, and a side 58 of the rail 15c makes surface contact with the article body portion 50.

Figure 6B:
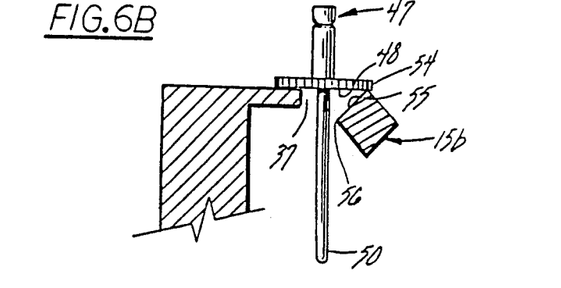
Figure 6C:
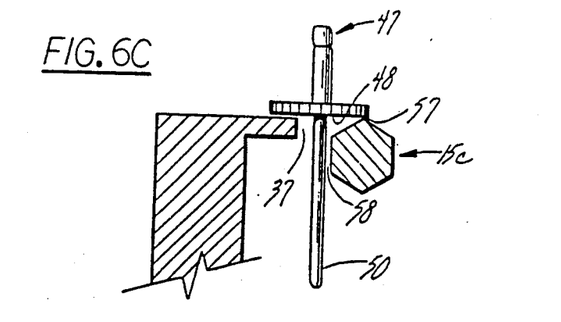
Figure 6D:
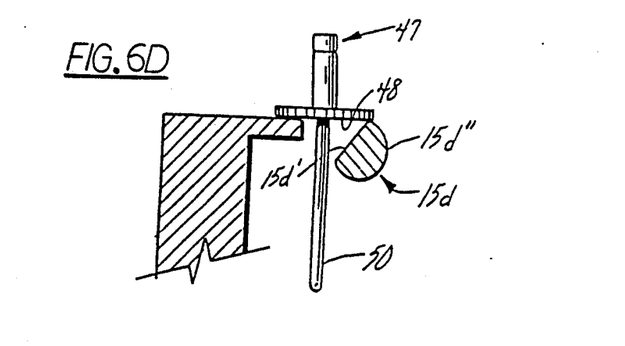

FIG. 6d shows yet another alternative embodiment wherein a rail 15d formed in the shape of a rod has discrete adjacent rail portions 15d' and 15d" which, as in the above described embodiments of FIGS. 6b and 6c, in cross-section form a point defining a longitudinally extending edge on the rail to provide point bearing contact. In each of the embodiments shown in FIGS. 6a, 6b, 6c and 6d, the outer rail provides single point bearing contact with the bottom flanged surface of the article.

Figure 2:
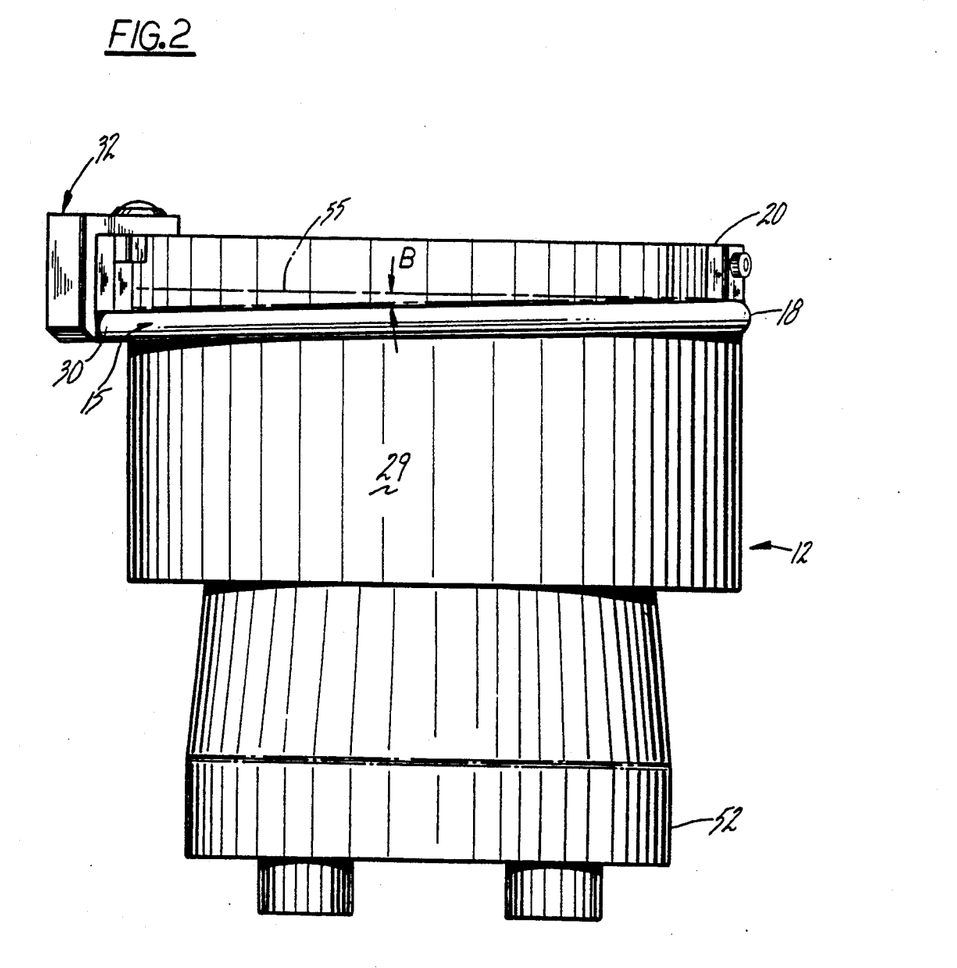
FIG. 2 is a side view of the feeder of FIG. 1 shown supported on a driver for vibratory oscillation.
Figure 5:
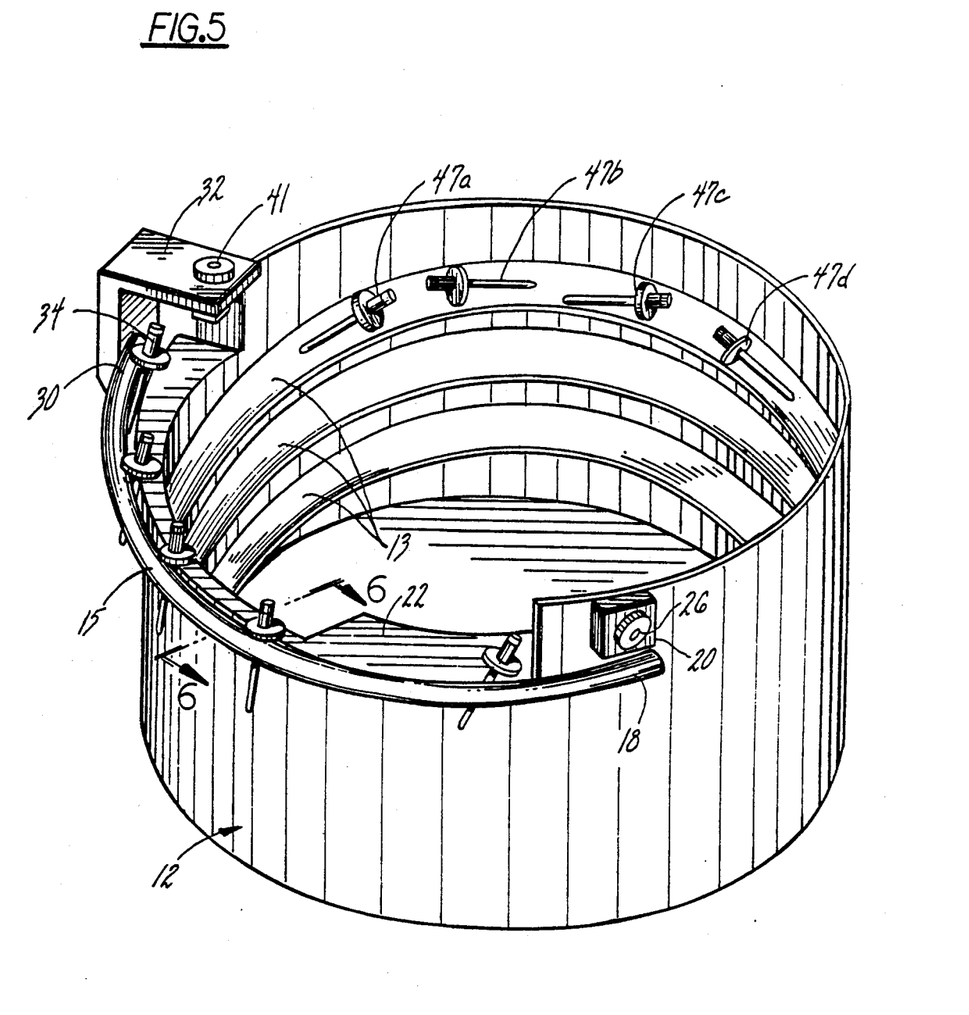
FIG. 5 is an isometric view of the feeder of FIG. 1 showing rivets being fed.

Referring to FIGS. 2 and 5, in operation, the feeder bowl 12 is mounted on a vibratory driver 52 of any suitable type known in the art for vibrating the feeder bowl 12 for feeding articles received in the bowl on the feeder bowl output tooling surface 22. Flanged articles 47, e.g., rivets, are received in the bowl, wherein the center of gravity of the article is at or below its flange, and vibratory motion causes these articles to feed along the output tooling surface 22 in random orientations such as shown at 47a-d in FIG. 5. When the articles reach the point intermediate the length of the output tooling surface 22 adjacent the input rail end 18, the curved contour of the rail 15 causes the article 47 to roll and automatically orient the article in accordance with its center of gravity, thereby urging or "finessing" the elongated body portion 50 of each article to fall into the slot 37 under the influence of gravity. This automatic action of the vibratory feeder coupled with the force of gravity results in each of the series of articles being disposed in a generally upright orientation supported by its flanged surface 48 on rail bearing surface 45 and output tooling surface 22. Where the flange of the article is coincident with its center of gravity, the article will randomly assume one of two vertically oriented positions.

As best seen in FIG. 2, the rail 15 and the output tooling surface 22 are each disposed at a downwardly extending angle "B", with respect to a horizontal plane 55, to extend downwardly from the one rail end 18 to the opposing rail end 30 so that articles received for sliding movement on the rail are transferred both by the vibratory movement of the feeder bowl and by gravity. The slope of the angle "B" may be precisely varied by using adjustable mount 20 to change the height of the input rail end 18.

Figures 9, 10:
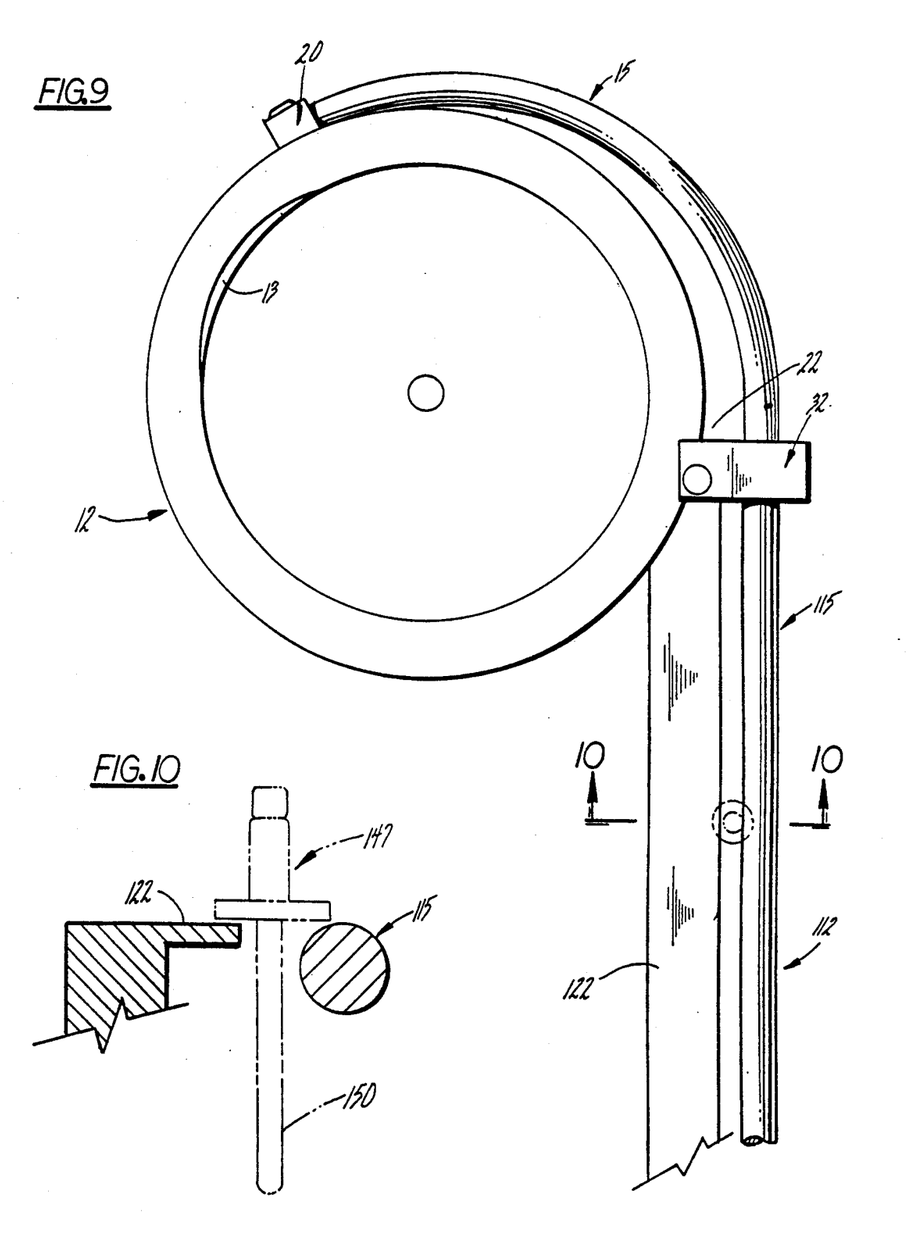
FIG. 9 is a plan view of an in-line feeder having a linear discharge track incorporating this invention.
FIG. 10 is an enlarged cross-sectional view taken generally along line 10—10 of FIG. 9.

It is contemplated that the invention of this disclosure may be incorporated in other applications. More specifically, jam-free, rapid delivery feeding of flanged articles may be enhanced by incorporating a linear discharge rail 115 of circular cross-section in an in-line discharge feeder 112 as shown in the embodiment of FIGS. 9 and 10 leading to a downstream fixture or machine, not shown, for a subsequent manufacturing step. The rail 115 is in spaced parallel relation to a flat surface 122 of an in-line track and provides point bearing contact engagement with a bottom surface of each flange of a progression of flanged articles for efficient, controlled delivery in stabilized position for discharge from feeder 112. That stablized position will be understood to be one wherein the body portion 150 of the article 147 is oriented in an essentially vertical position (FIG. 10). The feeder 112 will be understood to be of a type which also may be driven to effect a vibratory motion for enhanced product delivery.

To provide a discharge rail of structural integrity and simplicity of design while minimizing manufacturing costs and enhancing wearability and usage, the rail 15 may be manufactured of a high strength and durable material having a smooth external bearing surface 45 for reliable feeding of parts. Suitable materials for the rail include 300 series stainless steel rod, roll formed to conform to the outside diameter of the feeder bowl, and polished to a tool grade machine polish, e.g., by sand blasting. The rail may be heat treated to about a 46 to 52 Rockwell hardness and further polished to remove any imperfections from the rail surface if the rail will be used to feed more sensitive parts such as medical syringes and the like.

By virtue of the above described invention, the contoured rail and output tooling surface provide significantly reduced bearing contact with the flanged surfaces of the articles being handled. Article orientation and transfer is automatically achieved with significant increases in the feed rate of parts and minimized jamming in the discharge slot.

Although the invention has been illustrated and described with respect to the disclosed exemplary embodiments thereof, it should be understood by those skilled in the art that various other changes, omissions and additions may be made therein and thereto, without departing from the spirit and scope of this invention.

We claim:

1. Apparatus for transferring flanged articles from a vibratory feeder to a discharge station and comprising generally parallel feed rails, the feed rails being relatively positioned to cooperatively hold each article with its major axis disposed at an angle extending outwardly with respect to a side of the feeder, said angle decreasing as each article moves toward the discharge station.

2. The apparatus of claim 1 further including adjustable mounting means for securing the feed rails in fixed relation to one another with the rails in selectively vertically and horizontally spaced relation to one another, the rails defining a discharge slot therebetween for receiving the articles for sliding movement.

3. The rail of claim 1 further including first adjustable mounting means on one of said rail for mounting one of its ends, and second adjustable mounting means on said one rail for mounting the other of its ends, the first and second mounting means being adapted to support opposing ends of said one rail in fixed generally parallel relation to the other of the feed rails at selected relative vertical and horizontal spacing to one another.

4. Apparatus according to claim 1 wherein at least one of the feed rails has an external bearing surface, the external bearing surface being configured to provide point bearing contact with a flange of the article to be transferred.

5. Apparatus according to claim 4 wherein said external bearing surface includes a curved contoured rail portion providing said point bearing contact.

6. Apparatus according to claim 4 wherein said external bearing surface includes discrete adjacent rail portions which in cross-section form a point defining a longitudinally extending edge on the rail to provide said point bearing contact.

7. The apparatus of claim 4 wherein said one rail comprises a rod, the rod having a cross-section which defines said external bearing surface on an upper portion of said one rail.

8. The apparatus of claim 7 wherein a vibratory feeder bowl comprises the vibratory feeder, and wherein the rod has an arcuately extending major axis conforming to an external contour of the bowl.

9. Apparatus according to claim 7 wherein said one rail includes a lower portion below said external bearing surface which provides additional bearing contact with the body of the article underlying its flange for enchanced stability of the article during its transfer on the rails.

10. Apparatus for transferring articles each having a body with a flanged surface thereon and comprising a vibratory feeder bowl having a tooling surface terminating in an output tooling surface at a top of the feeder bowl, the output tooling surface having a discharge end, the tooling surface being adapted to receive the articles to be fed in random, generally horizontal positions along the tooling surface in response to vibratory movement of the feeder bowl, and an elongated rail having an arcuately extending major axis mounted in fixed relation to the bowl and in adjacent spaced relation to its output tooling surface, the rail and the output tooling surface defining a discharge slot therebetween for receiving the articles, the rail having an article supporting surface thereon with an external configuration providing point bearing contact with the flanged surface of each article, the rail including upstream and downstream ends, the downstream end of the rail being in confronting relation to the discharge end of the output tooling surface and jointly forming therewith a discharge outlet for the feeder bowl, an upper portion of the article supporting surface of the rail at its upstream end being in relatively raised relation to the confronting output tooling surface of the feeder bowl for tilting the body of an article supported therebetween outwardly of the bowl, the article supporting surface of the rail and the output tooling surface of the feeder bowl each extending in downwardly inclined generally parallel relation toward the discharge outlet for the feeder bowl, the upper portion of the article supporting surface of the rail at its downstream end being positioned relative to the output tooling surface for orienting the body of an article supported therebetween in a substantially vertical position, whereby the body of each article received within the slot is positioned at a discretely different angular orientation from that of an adjacent article therein for minimizing jamming in the slot.

11. Apparatus for transferring articles each having a body with a flanged surface thereon and comprising a vibratory feeder bowl having a tooling surface terminating in an output tooling surface at a top of the feeder bowl, the output tooling surface having a discharge end, the tooling surface being adapted to receive the articles to be fed in random, generally horizontal positions along the tooling surface in response to vibratory movement of the feeder bowl, and an elongated rail having an arcuately extending major axis mounted in fixed relation to the bowl and in adjacent spaced relation to its output tooling surface, the rail and the output tooling surface defining a discharge slot therebetween for receiving the articles, the rail having an article supporting surface thereon with an external configuration providing point bearing contact with the flanged surface of each article, first mounting means for connecting one rail end adjacent the output tooling surface of the feeder bowl, and second mounting means for connecting an opposing rail end adjacent the discharge end of the output tooling surface, the first and second mounting means serving to support the rail in adjacent relation to the output tooling surface and thereby forming a feed slot between the rail and output tooling surface arcuately extending between rail ends, whereby each article body is receivable within the slot adjacent said one rail end with the output tooling surface and article supporting surface on the rail cooperating to support the article by its flanged surface for sliding movement in a generally vertical orientation for transfer to the output tooling surface discharge end.

12. The apparatus of claim 11 wherein the first mounting means is adjustable for varying the height of the rail relative to the output tooling surface of the bowl.

13. The apparatus of claim 11 wherein the second mounting means is adjustable for varying the gap width of the feed slot.

14. Apparatus for transferring articles each having a body with a flanged surface thereon and comprising a vibratory feeder bowl having a tooling surface terminating in an output tooling surface at a top of the feeder bowl, the output tooling surface having a discharge end, the tooling surface being adapted to receive the articles to be fed in random, generally horizontal positions along the tooling surface in response to vibratory movement of the feeder bowl, and an elongated rail having an arcuately extending major axis mounted in fixed relation to the bowl and in adjacent spaced relation to its output tooling surface, the rail and the output tooling surface defining a discharge slot therebetween for receiving the articles, the rail having an article supporting surface thereon with an external configuration providing point bearing contact with the flanged surface of each article, the rail and the output tooling surface being disposed at a common downwardly extending angle with respect to a horizontal plane between opposing rail ends for gravity assisted sliding movement of articles within the slot toward the output tooling surface discharge end.

15. Apparatus for transferring articles each having a body with a flanged surface thereon and comprising a vibratory feeder bowl having a tooling surface terminating in an output tooling surface at a top of the feeder bowl, the output tooling surface having a discharge end, the tooling surface being adapted to receive the articles to be fed in random, generally horizontal positions along the tooling surface in response to vibratory movement of the feeder bowl, and an elongated rail having an arcuately extending major axis mounted in fixed relation to the bowl and in adjacent spaced relation to its output tooling surface, the rail and the output tooling surface defining a discharge slot therebetween for receiving the articles, the rail having an article supporting surface thereon with an external configuration providing point bearing contact with the flanged surface of each article, the rail and output tooling surface being relatively positioned to cooperatively hold each article with its major axis disposed at an angle extending outwardly with respect to a side of the feeder bowl, said angle decreasing as each article moves towards the discharge outlet of the feeder bowl, the rail and output tooling surface being relatively disposed to one another at the discharge outlet to support an article therebetween in a substantially vertical position parallel with the side of the feeder bowl for discharge.

16. The apparatus of claim 15 wherein the article supporting surface of the rail includes a curved portion which serves to provide point bearing contact for the articles on the rail.

17. The apparatus of claim 15 wherein the article supporting surface of the rail includes discrete adjacent rail portions which in cross-section form a point defining a longitudinally extending edge on the rail to provide said point bearing contact.

18. The apparatus of claim 15 wherein the rail includes upstream and downstream ends, the downstream end of the rail being in confronting relation to the discharge end of the output tooling surface and jointly forming therewith a discharge outlet for the feeder bowl.

19. The apparatus of claim 15 further including a vibratory driver for imparting vibratory motion to the feeder bowl.

20. A method for discharging and orienting flanged articles, having a center of gravity at or below its flange, for delivery from a vibratory feeding device and comprising the steps of positioning an entrance end of a discharge device having generally parallel spaced rails at an outlet of the feeding device, forming one of the rails with a contoured external bearing surface providing point bearing contact with the flanged articles along the entire length of said one rail for improved delivery rates and minimized jamming of the discharge device, mounting said one rail at an entrance end of the discharge device with its external bearing surface dispose above the other rail for supporting the flanged article in a position with a body portion of the flanged article depending from the rails and tilted away from a wall of the feeding device and from the other rail, and supporting an outlet end of the discharge device with its spaced rails positioning the body portions of the flanged article in a substantially vertical orientation.

21. The method of claim 20 further including the step of driving the spaced rails of the discharge device with an oscillating vibratory motion for assisting movement of the flanged articles along the rails.

22. The method of claim 20 further including the step of disposing the spaced rails at an angular orientation sloping downwardly from the entrance end to the outlet end of the discharge device for providing the flanged articles with a gravity assisted sliding motion along the rails.

23. The method of claim 22 including the further step of adjustably mounting the spaced rails of the discharge device for varying the slope of the downwardly extending angular orientation of the rails.

24. The method of claim 20 including the further step of adjustably mounting the spaced rails of the discharge device for varying the width of the spacing therebetween.

* * * * *